3,461,176
**PURIFYING ALCOHOLS BY DEHYDRATING POLY-
HYDRIC ALCOHOLS CONTAINED THEREIN**
Allan J. Lundeen and Charles M. Starks, Ponca City,
Okla., assignors to Continental Oil Company, Ponca
City, Okla., a corporation of Delaware
No Drawing. Filed June 30, 1966, Ser. No. 561,719
Int. Cl. C07c *29/24*
U.S. Cl. 260—643       7 Claims

ABSTRACT OF THE DISCLOSURE

Polyols in admixture with primary mono-alcohols prepared by the oxidation of aluminum alkyls followed by hydrolysis are selectively dehydrated by contacting said alcohols in vapor state with a neutral oxide of a Group III–B element at 200° to 500° C. to give a product free of polyols.

---

This invention relates to an improved dehydration process for the conversion of a polyol to a mono-functional oxygenated derivative. More particularly, the improved method of the invention comprises catalytically converting a polyol, especially the higher diols wherein the hydroxyl groups are closely and terminally positioned, to a product mixture consisting mainly of a mono-basic alcohol and carbonyl group containing hydrocarbons reducible to a mono-basic alcohol. In a preferred embodiment thereof, the present invention relates to a method for treating a higher linear primary alcohol or mixture thereof prepared in accordance with the Ziegler synthesis process to provide a product essentially completely free of polyfunctional contaminants.

In accordance with this invention, it has been found that a linear $C_4$–$C_{30}$ polyol having not in excess of three hydroxyl groups, particularly a diol, when contacted in vapor phase at a suitable elevated temperature with an oxide of an element of Group III–B of the periodic table can be selectively dehydrated to provide a mono-functional oxygenated derivative. It is, of course, well known that hydroxy compounds can be catalytically dehydrated and a variety of catalysts are applicable for facilitating this reaction. However, when it is desired to limit the dehydration of a polyhydric compound to a partial extent, such an objective is difficult to achieve in accordance with prior art dehydration practices. Similarly, the prior art dehydration practices are ineffective for selectively dehydrating a polyol which is present in combination with a similarly boiling alcohol, especially when the polyol is present in an exceedingly small amount. The selective dehydration of the polyol content of the such compositions constitutes the foremost objective of this invention. Especially representative of the latter compositions are the alcohol products prepared in accordance with the Ziegler synthesis method.

In accordance with this synthesis method, a lower aluminum alkyl, specifically aluminum triethyl, is reacted with ethylene whereby the latter progressively adds to the aluminum triethyl to provide a complex mixture of aluminum alkyls commonly referred to as a growth product. The alkyl residue of the growth product follows a statistical distribution pattern peaked with such groups having $2m+2$ carbon atoms where $m$ represents the mean number of ethylene additions accomplished in the course of the growth reaction.

In the production of alcohols, the growth product is next oxidized by contact with air at an elevated temperature. The oxidation step provides an aluminum alkoxide mixture which upon hydrolysis yields a corresponding mixture of primary alcohols. The oxidation step also results in the formation of a very small amount of oxygenated material which is converted to polyol in the hydrolysis procedure. The polyol content of the hydrolysis product consists essentially of 1,2- and 1,3-dihydroxy compounds having a carbon atom length distribution corresponding to about that of the starting growth product. Since the diols present in a hydrolysis product exhibit boiling points which are substantially the same as that of the various mono-basic alcohols present therein, it is not feasible to effect their removal by conventional thermal distillation practices.

The removal of the polyhydric contaminants from the alcohol mixtures, however, is an essential consumer requisite insofar as the principal uses of the alcohols require that they be essentially completely free of any polyhydric content. For example, in the preparation of the sulfated derivatives of these alcohols for use as detergents, the diol content cyclizes to yield an ether compound having a very objectionable odor. For the purpose of this use application it is desirable to completely remove the diol content of the alcohol mixture. Nevertheless, if such content is reduced to 0.1 percent or less, a sulfated derivative thereof having acceptable odor characteristics can be obtained.

Another important use of the primary alcohols obtained in accordance with the Ziegler synthesis method is in the preparation of viscosity index improvers for lubricating oil compositions. These improvers are the polyacrylates wherein the ester groupings are derived from a $C_8$–$C_{18}$ alcohol or mixture thereof. In the manufacture of polyacrylates for this use, it is desirable to have an exceedingly small amount of diol in the esterifying alcohol or mixture. The maximum amount of polyhydric content that can be tolerated in the preparation of the polymeric improver, however, is very critical and is far less than the amount of diol inevitably associated with the alcohols obtained by hydrolyzing oxidized growth reaction products.

In its broadest aspect, the present invention comprises contacting a linear polyol in vapor phase with a neutral oxide of an element of Group III–B of the periodic table at an elevated temperature to convert the polyol principally to a carbonyl group containing hydrocarbons reducible to monobasic alcohols. A preferred embodiment of the instant invention is a process whereby a $C_6$–$C_{30}$ primary alcohol or mixture thereof containing a similar boiling diol present in the amount of less than about 10% is treated in the aforesaid manner for the purpose of selectively converting the diol content of the alcohol to substantially lower boiling monofunctional oxygenated derivatives.

While the neutral oxides of all of the elements of Group III–B of the periodic table are applicable in the practice of this invention, certain of these elements because of availability, efficiency and other considerations stand out as most suitable for the instant purposes. These include the oxides of the elements thorium, scandium, yytrium and the oxide mixture didymia which is a commercially availble mixture of rare earth oxides obtained from nonazite ore. A typical composition of didymia is: 45–56% $La_2O_3$; 9–10% $Pr_6O_{11}$; 32–33% $Na_2O_3$; 1–2% $ClO_2$; 5–6% $Sm_2O_3$; 3–4% $Gd_2O_3$; 0.4 $Y_2O_3$ and 1–2% other oxides. Especially preferred among the above-enumerated catalysts are thoria and didymia. These catalysts can be employed as such or more preferably they can be used supported on a catalytically neutral base. The advantage of using a supported catalyst is primarily one of economics. In addition, it has also be found that a supported catalyst provides for optimum catalytic efficiency and thus milder dehydration reaction conditions can be observed. A suitable neutral base for supporting the catalyst is represented by an alumina which by itself is not significantly active in promoting the dehydration of alcohols. If it is desired to use unsupported catalyst, thoria for instance, a convenient form thereof consists of small glass beads coated with the catalyst.

The broad range of temperatures applicable for carrying out the present invention is from about 200 to 500° C. A more suitable range is from about 250 to 400° C. In the practice of the preferred embodiment of the invention, the use of a supported catalyst in combination with a temperature within the latter range results in essentially complete conversion of the polyol with nil degradation of the desirable alcohols. While higher temperatures can be employed to reduce reaction residence time to a minimum, there is a very minor amount of degradation of desirable alcohols due to the inherent, albeit slight, non-selective catalytic activity of the contemplated alumina supports.

As indicated, reaction residence time, that is, the time the polyol or diol containing alcohol mixture is in contact with the catalyst, is dependent upon the extent of dehydration of the polyhydric component desired and upon the operating temperature. As one would expect, the higher the operating temperature the less residence time will be required. It is well to mention that the various primary alcohols or mixtures specifically contemplated herein can be reacted under conditions which result in complete selective dehydration of the diol content to mono-functional derivatives in a one-step operation obviating the need for further cycling the contacted material. The process of this invention can be carried out under atmospheric sub- or super-atmospheric pressure. Quite obviously the selection of pressure conditions will depend upon the operating tempertaure contemplated in light of the particular volatility characteristics of the material so treated.

In the practice of the preferred embodiment, our dehydration process is extremely selective in converting polyols to mono-oxygenated derivatives with substantially no degradation of the primary alcohols. The resultant conversion products are a mixture of a plurality of monofunctional oxygenated compounds. All of such derivatives, however, exhibit a substantially lower boiling point than the alcohol and thus, can be removed by a simple distillation or topping procedure. When the present invention is employed for the purpose of reducing the polyol content of alcohols derived from oxidized growth reaction products, it is preferred to follow the conventional procedure of hydrogenating the alcohol mixture as the final finishing step before removal of the light ends. Hydrogenation can be accomplished in the presence of any conventional nickel catalyst at about 300 p.s.i.g. and at about 130° C. A suitable hydrogenation time is from about 30 to 90 minutes.

To illustrate further to those skilled in the art the nature of this invention, the following examples are presented. As indicated, these examples are given primarily by way of illustration and accordingly, any enumeration of details contained therein which is not expressed in the appended claims is not to be interpreted as constituting a limitation on the invention.

EXAMPLE I

This example outlines a plurality of dehydration runs representative of the best mode contemplated for carrying out the preferred embodiment of the invention and also serves to illustrate the degree of beneficial results obtainable in the implementation of the invention in this connection.

The apparatus employed in these runs consisted of an elognated, electrically heated tubular reactor packed with catalyst. The catalyst for one series of runs was one-eighth inch pellets of thoria supported on a catalytically neutral $\gamma$-alumina base and in the other series the catalyst material was similarly sized glass beads having a thin coating of the thorium oxide. The feed to the reactor for each run was initially pumped using a Sigmamotor pump into a preheater or vaporizer consisting of a packed bed of glass beads maintained at or slightly above the reaction temperature observed in the particular run concerned. The vaporized feed from the preheater was then passed under reduced pressure in the order of from about 10–33 mm. Hg through the catalyst bed which contained an initial section of inert packing material for the purpose of insuring that the vaporized feed would be at the desired reaction temperature. After passing over the catalyst section, the treated vapors were condensed and collected.

The specific conditions observed in the various runs of this example are set forth in the following Table I. The composition of the treated products of each run as well as that of the feeds of Runs 8 and 20–23 was determined by gas chromatographic analysis. All parts or percentages are by weight unless otherwise indicated.

TABLE I

| Run No.: | Catalyst | Feed | Feed rate, ml./min./ gm. Cat. | Temp., °C. | Polyol percentages | | |
|---|---|---|---|---|---|---|---|
| | | | | | Initial | Product | Removed |
| 1 | Thoria | 1% 1,3-octanediol in 1-octanol | 0.152 | 319 | 0.93 | 0.10 | 89 |
| 2 | do | do | 0.152 | 342 | 0.93 | 0.02 | 98 |
| 3 | do | do | 0.170 | 310 | 0.93 | 0.33 | 76 |
| 4 | do | do | 0.167 | 360 | 0.93 | 0.085 | 91 |
| 5 | do | do | 0.157 | 361 | 0.79 | 0.009 | 99 |
| 6 | do | do | 0.125 | 353 | 0.79 | 0.010 | 99 |
| 7 | do | do | 0.148 | 383 | 0.79 | 0.005 | 98 |
| 8 | do | See Note 1 | 0.140 | 355 | 1.2 | 0.03 | 98 |
| 9 | Thoria/alumina | 1% 1,3-octanediol in 1-octanol | 0.0158 | 200 | 1.0 | | 99.4 |
| 10 | do | do | 0.0173 | 242 | 1.0 | | 100 |
| 11 | do | do | 0.0188 | 220 | 1.0 | | 100 |
| 12 | do | 1% 1,3-butanediol in 1-octanol | 0.0249 | 323 | 1.0 | | 100 |
| 13 | do | do | 0.0415 | 323 | 1.0 | | 99.0 |
| 14 | do | do | 0.0510 | 323 | 1.0 | | 98.0 |
| 15 | do | do | 0.0603 | 323 | 1.0 | | 95.0 |
| 16 | do | do | 0.0691 | 323 | 1.0 | | 90.0 |
| 17 | do | do | 0.0427 | 303 | 1.0 | | 94.0 |
| 18 | do | do | 0.0190 | 303 | 1.0 | | 100 |
| 19 | do | do | 0.0593 | 298 | 1.0 | | 94 |
| 20 | do | See Note 1 | 0.0163 | 315 | 1.5 | 0.02 | 99 |
| 21 | do | do | 0.0452 | 313 | 1.5 | 0.07 | 95.5 |
| 22 | do | See Note 2 | 0.0140 | 256 | 1.5 | 0.02 | 98 |
| 23 | do | See Note 3 | 0.0332 | 314 | 2.2 | 0.05 | 98 |

Note 1, Oxidized growth product fractionated to yield a mixture of $C_{12}$ and $C_{14}$ primary alcohols.
Note 2, Oxidized growth product fractionated to yield a mixture of $C_{12}$, $C_{14}$ and $C_{16}$ primary alcohols.
Note 3, Oxidized growth product fractionated to yield a mixture of $C_{16}$ and $C_{18}$ primary alcohols.

EXAMPLE II

One of the two-fold purposes of this example is to illustrate the chemical make-up of the conversion products resulting from the dehydration of a higher diol in accordance with this invention. The other is to show that the instant process results in the selective dehydration of the polyol component of a polyol/alcohol mixture.

The reactor employed was identical to that used in Example I. The catalyst was pellets of thoria supported on $\gamma$-alumina. The feed to the reactor was a mixture of 5 parts 1,3-octanediol and 95 parts 1-tetradecanol. The reaction temperature was 309° C. and the vapor feed rate was .0146 ml./min./gm. catalyst.

The collected crude product was topped to remove all components boiling lower than 1-tetradecanol. The residue of the topping operation was found to be substantially completely free of 1,3-octanediol and the amount of alcohol recovered corresponded almost quantitatively to the amount contained by the feed.

The overhead from the topping operation was analyzed by fraction collection from a GLPC column and thereupon obtaining the mass spectrum of each fraction. The mass spectral identification was confirmed by GLPC retention times for those materials where standards were available. The analytical results obtained are shown in the following Table II.

TABLE II.—1,3—OCTANEDIOL CONVERSION PRODUCTS

| Component | Appr. percent | Confirmed by GLPC |
|---|---|---|
| Octadiene | 8.6 | No. |
| 2-heptanone | 4.5 | No. |
| 3-octanone | 43.9 | Yes. |
| Uniden. peak | 6.0 | No. |
| 1-hexanol | 8.7 | Yes. |
| 3-octanol | 7.3 | Yes. |
| 1-octen-3-ol | 4.5 | Yes. |
| Unsat. primary octanols | 16.6 | No. |

We claim:

1. A process for dehydrating diols to mono-functional oxygenated derivatives said diols being contained in $C_6$ to $C_{30}$ primary alkanols prepared by the oxidation and subsequent hydrolysis of aluminum alkyls which aluminum alkyls are made by reacting a lower aluminum alkyl with ethylene and in which the alkanols contain less than about 10 percent of 1,2- and 1,3-glycols having boiling points substantially the same as said alkanols, said process comprising contacting in the vapor state said alkanols containing said glycols with a neutral oxide of a group III–B element at a temperature in the range 200 to 500° C.

2. The process of claim 1 wherein said oxide is selected from the group consisting of thoria, scandia, yttria, and a composition comprising about: 45 to 56 percent $La_2O_3$; 9 to 10 percent $Pr_6O_{11}$; 32 to 33 percent $Na_2O_3$; 1 to 2 percent $ClO_2$; 5 to 6 percent $Sm_2O_3$; 3 to 4 percent $Gd_2O_3$; and 0.4 percent $Y_2O_3$ and wherein the oxide is contacted with the alcohol at a temperature between about 250° C. and 400° C.

3. A method in accordance with claim 1 wherein said oxide has a composition comprising about: 45 to 56 percent $La_2O_3$; 9 to 10 percent $Pr_6O_{11}$; 32 to 33 percent $Na_2O_3$; 1 to 2 percent $ClO_2$; 5 to 6 percent $Sm_2O_3$; 3 to 4 percent $Gd_2O_3$; and 0.4 percent $Y_2O_3$ and wherein the oxide is contacted with the alcohol at a temperature between about 250 and 400° C.

4. A method in accordance with claim 1 wherein said oxide is thoria and wherein the thoria is contacted with the alcohols at a temperature between about 250 and 400° C.

5. A method in accordance with claim 4 wherein said thoria is supported on a catalytically neutral alumina base.

6. A method in accordance with claim 5 wherein said catalytically neutral alumina is $\gamma$-alumina.

7. A method in accordance with claim 1 wherein said alcohol product is hydrogenated.

References Cited

UNITED STATES PATENTS

| 1,813,953 | 7/1931 | Reppe | 260—596 |
| 1,875,529 | 1/1933 | Taylor et al. | 260—596 |
| 1,944,153 | 1/1934 | Martin | 260—681 |
| 2,086,713 | 7/1937 | Grun | 260—642 |
| 2,620,357 | 12/1952 | Arundale et al. | 260—596 |
| 2,775,623 | 12/1956 | Bell | 260—643 |
| 2,885,442 | 5/1959 | McCulloch et al. | 260—596 |
| 3,283,015 | 11/1966 | Starks. | |
| 3,308,173 | 3/1967 | Emrick | 260—642 |

FOREIGN PATENTS

| 123,704 | 3/1947 | Australia. |
| 929,325 | 6/1963 | Great Britain. |

BERNARD HELFIN, Primary Examiner

J. E. EVANS, Assistant Examiner

U.S. Cl. X.R.

260—89, 596, 642, 681